United States Patent
Ashton et al.

(10) Patent No.: US 8,110,782 B2
(45) Date of Patent: Feb. 7, 2012

(54) HEATED ARCHITECTURAL PANEL SYSTEM AND METHOD

(75) Inventors: Dillon R. Ashton, Luckey, OH (US); Peter F. Gerhardinger, Maumee, OH (US)

(73) Assignee: Engineered Glass Products, LLC, Chicago, IL (US)

( * ) Notice: Subject to any disclaimer, the term of this patent is extended or adjusted under 35 U.S.C. 154(b) by 177 days.

(21) Appl. No.: 12/657,048

(22) Filed: Jan. 13, 2010

(65) Prior Publication Data

US 2010/0116816 A1 May 13, 2010

Related U.S. Application Data

(62) Division of application No. 11/259,331, filed on Oct. 26, 2005, now Pat. No. 7,675,007.

(60) Provisional application No. 60/654,304, filed on Feb. 18, 2005.

(51) Int. Cl.
*H05B 1/02* (2006.01)

(52) U.S. Cl. ......... 219/497; 219/494; 219/505; 219/213

(58) Field of Classification Search .................. 219/494, 219/497, 499, 501, 505, 202, 203, 213
See application file for complete search history.

(56) References Cited

U.S. PATENT DOCUMENTS

| | | | |
|---|---|---|---|
| 3,585,267 A | 6/1971 | Obersby | |
| 4,542,283 A | 9/1985 | Leverenz | |
| 4,726,333 A * | 2/1988 | Verheyen | 123/145 A |
| 6,303,911 B1 | 10/2001 | Welch, Jr. | |
| 6,365,876 B1 * | 4/2002 | Park | 219/219 |
| 6,917,019 B2 * | 7/2005 | Richter | 219/505 |
| 7,265,323 B2 | 9/2007 | Gerhardinger et al. | |
| 2005/0269312 A1 | 12/2005 | Gerhardinger et al. | |
| 2006/0081584 A1 | 4/2006 | Gaskell | |

* cited by examiner

*Primary Examiner* — Mark Paschall
(74) *Attorney, Agent, or Firm* — Marshall & Melhorn LLC

(57) ABSTRACT

Heated architectural panel temperature control systems and methods are provided for heating windows that are formed from heated architectural panels. The control system comprises the heated architectural panel that produces heat when connected to external AC power, a panel frame disposed around the panel periphery, and a temperature control circuit that is electrically connected to the window. The temperature control circuit, which may be disposed in the panel frame, controls the temperature of the panel by utilizing a Hall effect sensor and the panel temperature coefficient of resistance $\alpha$. The panel may comprise insulated glass panels, laminated structures, or combinations thereof, where the window is disposed in an opening of a building.

7 Claims, 3 Drawing Sheets

HEATED ARCHITECTURAL PANEL SYSTEM AND METHOD

RELATED APPLICATIONS

This application is a divisional application of and claims benefit, under 35 U.S.C. §120, of pending U.S. patent application Ser. No. 11/259,331, filed Oct. 26, 2005, now U.S. Pat. No. 7,675,007 which claims the benefit, under 35 U.S.C. §119(e), of U.S. Provisional Patent Application Ser. No. 60/654,304, filed Feb. 18, 2005, under 35 U.S.C. §111(b), which applications are incorporated by reference herein in their entireties.

BACKGROUND OF THE INVENTION

The present invention generally relates to controlling the heating of architectural panels and, more particularly, to a heated architectural panel system and a method for controlling the temperature of heated windows formed from the architectural panels.

U.S. Publication No. 2003-0127452 to Gerhardinger et al. (which is incorporated herein by reference, hereinafter '452 Publication) teaches the use of various electrical control systems for various types of heated panels.

U.S. Pat. No. 6,303,911 to Welch Jr. utilizes an electrically real resistor $R_1$ in series with a thin film resistive coating $R_2$ on a thin film glass heater that is used to heat a small liquid crystal display (LCD). In this LCD application, it appears that a control circuit provides a direct current (DC) supply voltage $V_{supp}$ to the series resistor $R_1$ and a thin film coating, which is assumed to have a known constant reference resistance $R_0$ at a corresponding reference temperature $T_0$. Through the use of the modeling technique $R_2=R_1(V_{supp}/V_1-1)$ and $T_2=T_0+(R_2-R_0)/a$, where $V_1$ is the voltage drop across the series resistor $R_1$ and "a" is defined to be a unique constant associated with particular thin film coating materials, the varying temperatures $T_2$ of the LCD application are estimated from $R_2$.

The LCD application appears to be suited for a printed circuit board (PCB), where the voltage $V_{supp}$ produces a DC current, which is relatively small (e.g., milliamps or less). The series resistor $R_1$, which forms a voltage divider with the thin film coating, appears to be physically small in size (possibly using or requiring in the order of a few square inches of area) and appears to be close in proximity to the LCD (e.g., no more than several inches apart).

In contrast to the LCD application, an architectural panel requires a much larger amount of heat that is supplied by alternating currents (AC) from several amps on up, wherein an impedance (that would include the series resistor $R_1$) would need to be large in size and, therefore, not desirable for an architectural application due to the generation of wasted heat. Additionally, it would not be advisable to provide high alternating currents in close proximity to low LCD segment currents, due, for example, to electromagnetic interference (EMI) and radio frequency interference (RFI).

In addition to being a performance inhibitor, the utilization of the series resistor can present potential safety problems by moving the reference point voltage of the glass window above that of AC neutral (i.e., essentially above ground potential), which can result in multiple paths to ground (commonly known as ground loops).

Also, building window heaters are physically large in size (e.g., many square feet), and the windows, power sources, and control circuits are likely to be separated by long distances from one another (often by as much as 100 feet or more).

When conducting electricity, the coating on a vertically oriented heated architectural panel does not act as a single resistor. Because heat rises due to convection, the top of the heated architectural panel becomes warmer than the bottom and the center of the panel. Also, the temperature at the center of the panel tends to be higher than the temperature at the sides of the panel. Therefore, if the coating were assumed to be one resistor, then the top and center of the panel would be overheated, when compared to the lower and side portions of the panel, and the bottom and sides of the panel would be under-heated, when compared to the upper and center portions of the panel. Therefore, compensation for these non-uniform temperatures must be considered in the architectural application, whereas the small LCD application need not be concerned with such factors.

As a result of the large size and the long separation distances, the reference resistance $R_0$ and, correspondingly, the reference temperature $T_0$ can vary from window to window and under varying operating conditions. If the LCD application modeling were to be applied to known heated architectural panel installations, large transformers and AC/DC converters would be required. This practice, however, would result in wasting significant amounts of electrical power.

Due to ever increasing and high energy costs, proposed industry window energy standards will likely require higher energy efficiencies for heated window applications, which the use of the LCD application modeling techniques could not provide.

On the other hand, measuring the temperature of heated architectural windows, without the use of a sensor, while utilizing AC power to heat the windows, presents additional challenges. For example, in order to determine the resistance of the coating in an AC powered window, careful consideration needs to be given to line voltage fluctuations and transient surges. Otherwise, the resistance of the coating cannot be correctly determined.

In conjunction with the use of AC power and because the various parts of an architectural thin film heater circuit are distant from one another, consideration must also be given to EMI, RFI (in fact the heated window assembly can act as an antenna), robust electrical connections, lead wire voltage loss, shielding of wiring, and other factors.

As a result of these differences between the small scale LCD application and the large scale architectural applications, the modeling techniques of the LCD application do not effectively apply to architectural applications.

Thus, those skilled in the art continue to seek a solution to the problem of how to provide a better heated architectural panel system and a method for controlling the temperature of heated windows formed from architectural panels.

SUMMARY OF THE INVENTION

The present invention relates to a heated architectural panel temperature control system for a building and a method for controlling heating of windows formed from heated architectural panels. The heated architectural panel system comprises the architectural panel (for example, a glass sheet) with a low-emissivity conductive coating (for example, doped tin oxide) disposed on a major surface thereof. The heated architectural panel system further comprises a panel frame (also described as a cover, a chase, or a mounting member) disposed preferably around the panel periphery, thus forming a heated window, and a temperature control circuit that is electrically connected to the heated window.

The heated window, which produces heat when the electrically conductive coating is connected to a source of alternating current, is disposed in an opening of a building, wherein the temperature control circuit controls the temperature of the panel by utilizing the panel temperature coefficient of resistance a.

The architectural panels of the present invention may comprise insulated glass panels, laminated structures, or combinations thereof (see the '452 Publication).

Further advantages of the present invention will be apparent from the following description and appended claims, reference being made to the accompanying drawings forming a part of the specification, wherein like reference characters designate corresponding parts of several views.

DETAILED DESCRIPTION OF THE INVENTION

Figure 1:
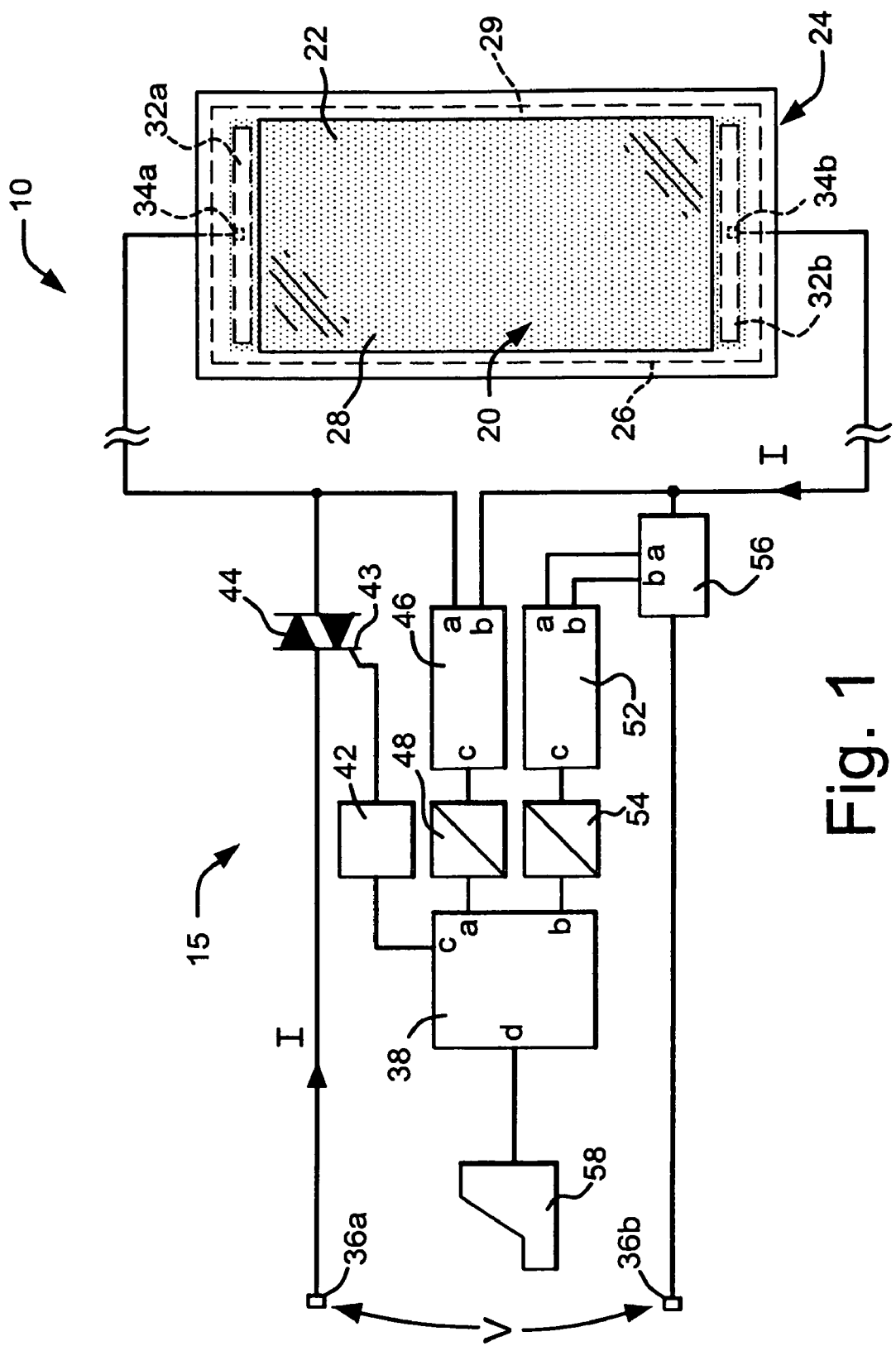
FIG. 1 illustrates an electrical layout of a first control circuit in accordance with the present invention.

As illustrated in FIG. 1, the present invention employs a heated architectural panel temperature control system 10 that has an electrical temperature control circuit 15 and a heated window 20 that comprises a heated architectural panel 22 having a panel frame 24 (also described as a cover, a chase, or a mounting member) disposed on the heated architectural panel periphery 26. The heated panel 22 may comprise, for example, glass, glass-ceramic, ceramic, or plastic. The heated panel 22 may be structured as insulated glass panels, laminated structures, or combinations thereof.

A low-emissivity conductive coating 28 (although shown in FIG. 1 as being shaded, the coating 28 is preferably substantially transparent, said coating 28 being also known as a conductive film) is disposed on a major surface 29 of the heated architectural panel 22. The conductive coating 28 (for example, Pilkington TEC 15) is in electrical communication with two bus bars 32a,b. In FIG. 1, the bus bars 32 are shown hidden behind the panel frame 24 but could be disposed in the visual portion of the heated window 20.

The '452 Publication provides further details for panel electrical connections 34a,b, such as the metallic tabs shown and described therein, which are in electrical communication with the bus bars 32. The glass panels 22 and windows 20 of the present invention preferably comply with Underwriters Laboratories (UL) recognized heater plate specifications.

Although not required, in order to minimize a chance for electrical shorting of the bus bars 32, the panels/windows 22, 20 may incorporate sufficient edge isolation between the thermally deposited metallic bus bars 32 and the panel edge 26. As an example, a twelve millimeter edge isolation specification assures that no conductive coating 28 is within twelve millimeters of the edge of the heated architectural panel 22. Also, the panel 22 may be composed of tempered glass for safety and be in compliance with the National Electric Code (NEC).

Electrically, the heated architectural panel temperature control system 10, which is shown in FIG. 1, is supplied with an external AC electrical voltage (V) at AC power terminals 36a,b. It should be appreciated that the present invention is not limited by the type of AC external power that is connected to the temperature control circuit 15, which can be configured for the United States and/or foreign countries, where, for example, nominal AC voltages of 120 VAC, 210 VAC, and 240 VAC at frequencies of 50 and 60 Hertz may preferably be provided.

Again referring to FIG. 1, the temperature control circuit 15 comprises a micro-controller 38 that electrically cooperates, by way of output port 38c, with a gate drive 42, which in turn electrically cooperates with a gate 43 of a current switch 44 (for example, a triac) to allow an incoming AC current (I), which may be unconditioned, to pass through the current switch 44, thus applying the unconditioned incoming AC voltage V across the heated window 20 and across first signal conditioner ports 46a,b. As used herein, the micro-controller 38 is an electronic device that may comprise a microprocessor.

It should, however, be further appreciated that the present invention may utilize zero-voltage (at the axis) switching technology, as taught by the '452 Publication, which would result in the incoming AC voltage V causing nearly zero EMI/RFI emissions.

Subsequently, the current I heats the window 20 while a first signal conditioner 46 filters and conditions certain electrical characteristics (e.g., distortion, electrical noise, etc.) that may accompany the incoming voltage V at the ports 46a,b.

The first signal conditioner 46 then outputs from port 46c a modified voltage signal to a first digital/analog converter 48. The first digital/analog converter 48, in turn, converts the modified voltage signal into a digital format that is passed on to the micro-controller 38 at input port 38a. Subsequently, the micro-controller 38 passes this digitized and modified voltage signal through a first algorithm within the programming of the micro-controller 38, from which the micro-controller 38 calculates the panel voltage drop $V_P$ across the conductive coating 28. Concurrently with the determination of the panel voltage $V_P$, the electrical current I is indirectly sampled by a current sensing device 56 at ports 56a,b.

In the present invention, indirect sampling is defined to mean current sensing that is achieved without directly diminishing the current flowing through the architectural panel 22. The current sensing device 56, for example a Hall effect sensor, satisfies this definition. In contrast, a series resistor would directly diminish the current I that flows through the heated panel 22.

In turn, the current sensing device 56 passes an indirect sample of the current signal I on to a second signal conditioner 52 (at terminals 52a,b) that filters and conditions certain electrical characteristics (e.g., distortion, electrical noise, etc.) from the indirect sample current signal. This modified current signal is then passed on to a second digital/analog converter 54 by way of terminal 52c.

The second digital/analog converter 54, in turn, converts the modified current signal into a digital format that is passed on to the micro-controller 38 at input port 38b. Subsequently, the micro-controller 38 passes this digitized and modified current signal through a second algorithm within the programming of the micro-controller 38, from which the micro-controller 38 calculates the panel current $I_P$.

The micro-controller 38 then mathematically divides the calculated voltage $V_p$ (that resulted from filtering and conditioning) by the calculated current $I_P$ (that also resulted from filtering and conditioning) to determine a variable resistance $R_P$ (i.e., $R_P = V_P/I_P$) of the heated architectural panel 22.

After determining $R_P$, the micro-controller 38 mathematically determines the temperature $T_P$ of the panel 22 using the formula $T_P = T_0 + ((R_P - R_0)/(R_0 \times \alpha))$, where $\alpha$ is the temperature coefficient of resistance. The temperature coefficient of resistance may be non-linear and may be determined dynamically at any time, or determined in advance of complete installation of the heated windows 20 and then programmed into the micro-controller 38. Thus, the present invention results in indirectly measuring the temperature of the heated architectural panel 22.

In general, the temperature coefficient of resistance a is defined to be a variable constant associated with an incremental change in temperature of a conductor that results in an incremental change in resistance for that conductor. Also, in the present invention, the conductor is not only considered to be the conductive coating 28, but may also include the wiring and various connections (for example, the bus bars 32 and the electrical connections 34), which can vary, for example, from one window to another and from each location of each window.

In the instant invention, the temperature of the heated panel 22 is determined without the use of: a) a series resistor, like $R_1$ of the aforementioned LCD application, that is in series with the heated panel, b) what appears to be a known and conditioned input voltage like $V_{SUPP}$, and c) a known resistor $R_0$ at a given $T_0$, as the LCD application teaches.

Instead, the present invention determines the architectural panel temperature by utilizing: a) the indirect current sensing device 56 that does not directly dissipate current I that passes through the panel 22, b) the unconditioned AC voltage V, c) the resistance $R_0$ (which varies from panel-to-panel under varying operating conditions, thus requiring calibration of each installed heated panel 22, said calibration may even be done dynamically during on-site operation of the heated architectural panel temperature control system 10), and d) the temperature coefficient of resistance α that may not be linear for all temperatures in the application temperature range of the architectural panels 22.

In the present invention, the current sensing device 56 adds little heat to the temperature control circuit 15 and does not inhibit the performance of the heated architectural panel temperature control system 10. Thus, the reference point voltage of the heated window 20 is not raised above that of the AC neutral.

As mentioned earlier, since the coating 28 on the panel 22 does not act as a single resistor (due at least in part to vertically rising heat convection and heat dissipation along the sides of the panels 22), controlling the temperature of the vertically oriented architectural panel 22 requires compensation for a significant temperature gradient that occurs from the bottom to the top and from the sides to the center of the panel 22. In the present invention, the micro-controller 38 determines an average temperature from top to bottom and from center to sides. This results in preventing hot spots on the panel 22 that could overheat and/or damage the panel 22.

Additional advantages of the use of the micro-controller 38 are that the micro-controller 38 can compensate for at least the following anomalies associated with the temperature control of architectural panels 22: 1) the Sun's intensity and the environmental conditions on and around the panels 22 (for example, heating and air conditioning within a building and exterior weather conditions), 2) the large size of the heated windows 20 (e.g., many square feet), 3) separation distances between the various parts of the heated architectural panel temperature control system 10, and 4) the length of the wiring (for example, the wiring between the control circuit 15 and the heated windows 20). This compensation results in automatic and accurate temperature control of the AC heated windows 20 that known heated architectural panel installations do not provide.

Further advantages of the use of the micro-controller 38 may include: 1) bulky and costly power converters can be avoided, 2) electrical/mechanical faults (for example, panel breakage and ground fault detection that utilizes ground fault circuit interrupter (GFCI)) and over temperature conditions can be sensed and acted upon, 3) potential personal danger (for example, electrical shock or physical injury) can be avoided, 4) calibration of system parts can be made at time of manufacturing, at time of installation, or dynamically during operation of the heated architectural panel temperature control system 10, and 5) optimization of energy efficiency can be achieved.

In addition, a user interface 58 that is common in the art (for example, a personal computer, a hand held device, a terminal to a mainframe computer, or a land based telephone), which may use wired or wireless means that are common in the art (for example, a keyboard, a mouse, a cell phone, an Apple iPod®, or a personal digital assistant (PDA)), assures simplicity of use (for example, setting and changing of system variables and recordation of operating conditions).

Although shown separately, the user interface 58 and the micro-controller 38 could be one unit and could be disposed on or within the panel frame 24.

As shown in FIG. 1, the user interface 58 is directly connected to port 38d of the micro-controller 38. However, by virtue of a modular design, the system 10 can utilize one micro-controller 38 to service a plurality of windows 20 or each of a plurality of windows 20 can be serviced by an individual micro-controller 38.

Figure 1A:
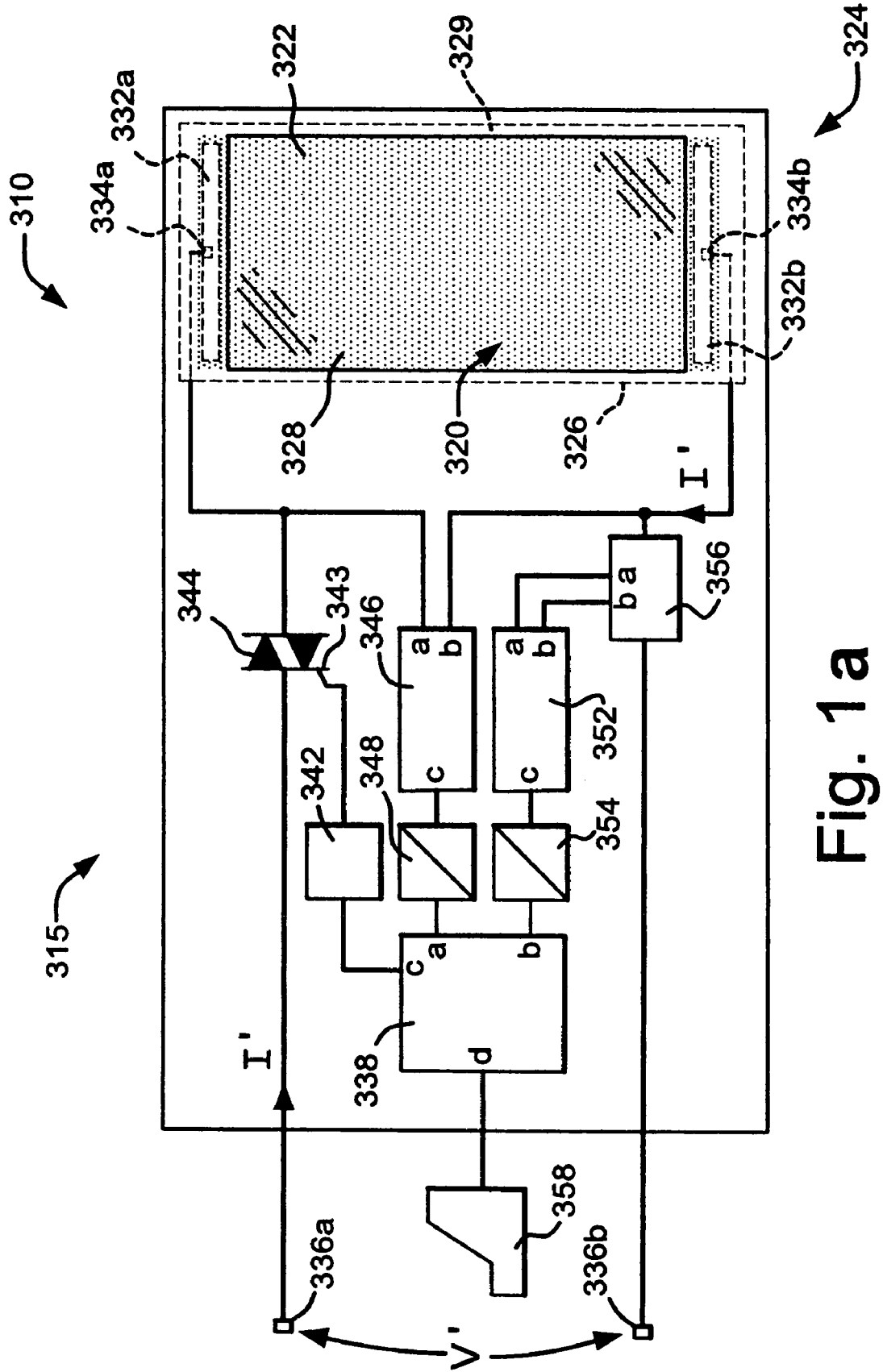
FIG. 1a illustrates an electrical layout of a second control circuit in accordance with an alternate embodiment of the invention.

FIG. 1a illustrates another embodiment of the present invention, which is similar to that shown in FIG. 1, except that a second indirect temperature measurement system 310 is disposed in a second panel frame 324 (or alternatively described as a second cover, chase, or mounting member). This embodiment utilizes a second temperature control circuit 315 for a second heated architectural panel 322. The system 310 is detailed in U.S. Utility application Ser. No. 11/200,724 that was filed Aug. 10, 2005, which is incorporated by reference herein.

In general, an AC voltage V' across second power terminals 336a,b potentially causes alternating current I' to flow through second connections 334a,b, second bus bars 332a,b, and through a second coating 328, which is disposed on a major surface 329 of the heated panel 322 that has a second peripheral edge 326. This results in heating the panel 322, which is disposed in a second opening 320.

A second temperature control micro-controller 338, which is similar to the micro-controller 38, is shown connected to a second interface device 358, which may or may not be disposed in the panel frame 324. The micro-controller 338 controls a second triac 344 by way of a second gate drive 342 via a second gate input 343 of the triac 344.

A third signal conditioner 346 provides an analog signal of the voltage V' to a third analog to digital converter 348, which in turn provides a digital representation of the voltage V' to the micro-controller 338 which may comprise a microprocessor. Subsequently, the micro-controller 338 passes this digitized and modified voltage signal through a third algorithm within the programming of the micro-controller 338, from which the micro-controller 338 calculates the panel voltage drop $V_P$ across the conductive coating 328.

A second current sensing device 356 (e.g., based on the Hall effect) indirectly senses the alternating current I', which is provided to a fourth signal conditioner 352 at terminals 352a,b. The fourth signal conditioner 352, in turn, provides an analog signal of the current I' to a fourth analog to digital converter 354, which passes along a digital form of the current I' to the micro-controller 338 to determine $I_P$. While utilizing a fourth algorithm, which is applied to the digital current and the digital voltage, the micro-controller 338 determines the temperature of the panel 322 in the manner described above for the embodiment of FIG. 1.

As further shown in FIG. 1a, the user interface 358 is directly connected to port 338d of the micro-controller 338. However, by virtue of a modular design, the system 310 can utilize one micro-controller 338 to service a plurality of windows 320 or each of a plurality of windows 320 can be serviced by an individual micro-controller 338.

It should be appreciated that although the circuits of FIGS. 1 and 1a are depicted, essentially, at a block diagram level, one skilled in the art would recognize that various other components (e.g., resistors, capacitors, integrated circuits, and the like) and connections are required for full implementation of same.

Figure 2:
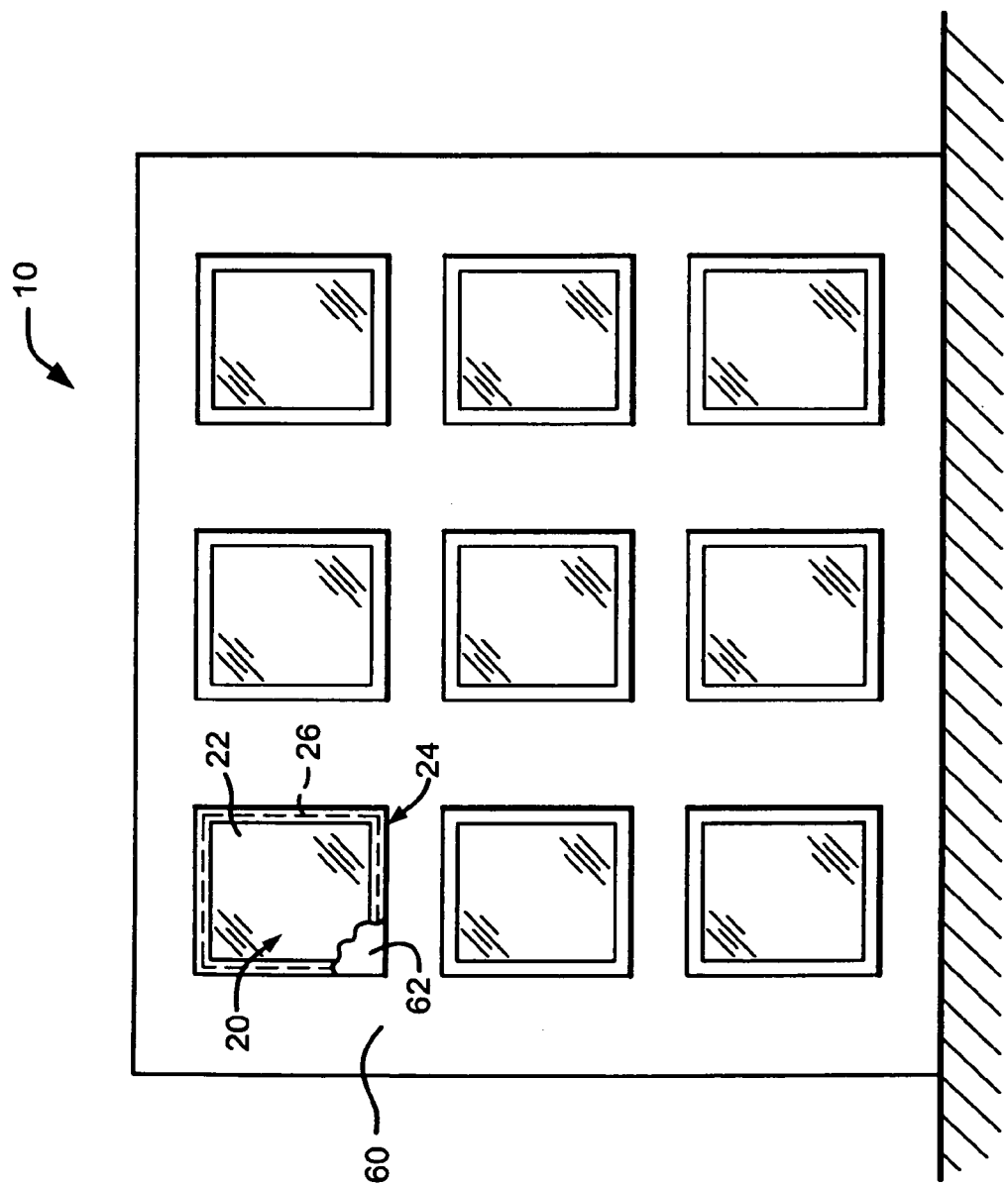
FIG. 2 illustrates an elevation view of a building having heated windows in accordance with the present invention.

Although only one heated window 20 or 320 is shown, respectively, in detail in FIG. 1 or 1a, FIG. 2 illustrates a building 60 having multiple heated windows 20, which could also be multiple heated windows 320. Each heated window 20 has a heated architectural panel 22 with the panel frame 24 disposed on the panel periphery 26. The heated window 20 is disposed in a building opening 62 (shown with the heated window 20 cut away at the heated window bottom left corner), wherein environmental conditions are then controlled by the heated architectural panel temperature control system 10.

In accordance with the provisions of the patent statutes, the principles and modes of operation of this invention have been described and illustrated in its preferred embodiments. However, it must be understood that the invention may be practiced otherwise than specifically explained and illustrated without departing from its spirit or scope.

What is claimed is:

1. A method of heating a heated architectural panel for a building, comprising:
   disposing at least one heated architectural panel in an opening in a building, the at least one heated architectural panel having a low-emissivity electrically conductive coating disposed on at least a major surface thereof;
   applying an electrical alternating current to the low-emissivity electrically conductive coating;
   controlling the temperature of the heated architectural panel utilizing a panel temperature coefficient of resistance a and a temperature control circuit comprising a current sensing device, the temperature control circuit electrically communicating with the low-emissivity electrically conductive coating; and
   heating an area within the building by way of the low-emissivity electrically conductive coating radiating heat only into the building.

2. The method of heating a heated architectural panel for a building of claim 1, further comprising:
   disposing a frame on at least a portion of the periphery of the heated architectural panel having the electrically conductive coating disposed thereon; and
   disposing a micro-controller within the frame, the micro-controller being utilized in the controlling of the temperature of the heated architectural panel utilizing the panel temperature coefficient of resistance $\alpha$.

3. The method of heating a heated architectural panel for a building of claim 1, wherein the heated architectural panel comprises glass, glass-ceramic, ceramic, or plastic.

4. The method of heating a heated architectural panel for a building of claim 1, wherein controlling the temperature of the heated architectural panel comprises:
   determining panel current $I_P$ by way of the current sensing device;
   determining panel voltage $V_P$ by way of a conditioned and filtered voltage signal;
   determining the resistance of a variable panel resistance $R_P$ by calculating $V_P/I_P$; and
   calculating a panel temperature $T_P$ by way of the equation $T_P = T_0 + ((R_P - R_0)/(R_0 \times \alpha))$, where $R_0$ is the calibrated reference resistance that corresponds to a reference temperature $T_0$.

5. The method of heating a heated architectural panel for a building of claim 1, wherein controlling the temperature of the heated architectural panel further comprises, determining the temperature coefficient of resistance $\alpha$, which includes the heated architectural panel, bus bars, and wiring, and determining $R_0$ via calibrating the heated architectural panel, and further, wherein the micro-controller comprises a microprocessor.

6. The method of heating a heated architectural panel for a building of claim 1, wherein the heated architectural panel comprises an insulated glass panel, a laminated structure, or combinations thereof.

7. The method of heating a heated architectural panel for a building of claim 1, wherein the current sensing device comprises a Hall effect sensor.

* * * * *